United States Patent
Hill et al.

(10) Patent No.: US 9,689,254 B2
(45) Date of Patent: Jun. 27, 2017

(54) WELL MONITORING BY MEANS OF DISTRIBUTED SENSING MEANS

(71) Applicant: OPTASENSE HOLDINGS LIMITED, Farnborough, Hampshire (GB)

(72) Inventors: David John Hill, Dorset (GB); Magnus McEwen-King, Hampshire (GB); Patrick Tindell, Dorset (GB)

(73) Assignee: Optasense Holdings Limited (GB)

(*) Notice: Subject to any disclaimer, the term of this patent is extended or adjusted under 35 U.S.C. 154(b) by 79 days.

(21) Appl. No.: 14/816,456

(22) Filed: Aug. 3, 2015

(65) Prior Publication Data
US 2015/0337653 A1 Nov. 26, 2015

Related U.S. Application Data

(62) Division of application No. 13/320,877, filed as application No. PCT/GB2010/001064 on May 27, 2010, now abandoned.

(30) Foreign Application Priority Data

May 27, 2009 (GB) .................. 0909038.2
Nov. 13, 2009 (GB) .................. 0919915.9

(51) Int. Cl.
*G01V 1/50* (2006.01)
*E21B 47/00* (2012.01)
(Continued)

(52) U.S. Cl.
CPC ........ *E21B 47/16* (2013.01); *E21B 43/11857* (2013.01); *E21B 43/26* (2013.01);
(Continued)

(58) Field of Classification Search
CPC .................. G01V 1/50; E21B 47/00
(Continued)

(56) References Cited

U.S. PATENT DOCUMENTS

| 5,757,487 A | 5/1998 | Kersey |
| 5,804,713 A | 9/1998 | Kluth |

(Continued)

FOREIGN PATENT DOCUMENTS

| EP | 1400818 | 3/2004 |
| GB | 2398805 | 7/2006 |

(Continued)

OTHER PUBLICATIONS

Stewart, "Acoustic Emission Monitoring During Hydraulic Fracturing", SPE Formulation Evaluation (Paper 20970), Jun. 1992, pp. 139-144, XP002651924.
(Continued)

*Primary Examiner* — Albert Wong
(74) *Attorney, Agent, or Firm* — McDonnell Boehnen Hulbert & Berghoff LLP (57) ABSTRACT

Methods and apparatus for downhole monitoring are provided by interrogating an unmodified optic fiber (102) arranged along the path of a well bore (106) to provide a distributed acoustic sensor and sampling data gathered from a plurality of contiguous sensing portions of the fiber. The sampled data is processed to determine one or more well bore parameters. The well bore parameters may comprise a well condition profile, and may be obtained in response to an acoustic stimulus.

21 Claims, 4 Drawing Sheets

(51) Int. Cl.
  *E21B 47/16*    (2006.01)
  *E21B 43/1185*  (2006.01)
  *E21B 43/26*    (2006.01)
  *E21B 47/10*    (2012.01)
  *E21B 47/12*    (2012.01)
  *G01H 9/00*     (2006.01)

(52) U.S. Cl.
  CPC .......... *E21B 47/101* (2013.01); *E21B 47/123* (2013.01); *G01V 1/50* (2013.01); *G01H 9/004* (2013.01); *G01V 2210/1429* (2013.01); *G01V 2210/646* (2013.01)

(58) Field of Classification Search
  USPC ............. 166/250.1, 308.1, 177.5; 367/81, 35
  See application file for complete search history.

(56) References Cited

U.S. PATENT DOCUMENTS

| | | | |
|---|---|---|---|
| 6,204,920 | B1 | 3/2001 | Ellerbrock et al. |
| 6,268,911 | B1 | 7/2001 | Tubel et al. |
| 6,618,148 | B1 | 9/2003 | Pilgrim et al. |
| 7,202,998 | B2 | 4/2007 | Jenkins et al. |
| 7,284,903 | B2 | 10/2007 | Hartog |
| 7,470,594 | B1 | 12/2008 | Foote et al. |
| 7,946,341 | B2 * | 5/2011 | Hartog .................... E21B 43/26 166/254.1 |
| 7,965,909 | B2 | 6/2011 | Hill et al. |
| 8,483,430 | B2 | 7/2013 | Lycett |
| 9,417,103 | B2 * | 8/2016 | Chen .................... G01L 11/025 |
| 2004/0045705 | A1 | 3/2004 | Gardner et al. |
| 2004/0104029 | A1 | 6/2004 | Martin |
| 2006/0028637 | A1 | 2/2006 | Payton |
| 2006/0081412 | A1 | 4/2006 | Wright et al. |
| 2007/0047867 | A1 | 3/2007 | Goldner |
| 2009/0003133 | A1 | 1/2009 | Dalton et al. |
| 2009/0097015 | A1 | 4/2009 | Davies et al. |
| 2009/0114386 | A1 | 5/2009 | Hartog et al. |
| 2012/0057432 | A1 * | 3/2012 | Hill .................... E21B 43/11857 367/81 |
| 2014/0036628 | A1 * | 2/2014 | Hill .................... G01V 1/42 367/35 |

FOREIGN PATENT DOCUMENTS

| | | |
|---|---|---|
| GB | 2442745 | 4/2008 |
| WO | WO2005/033465 | 4/2005 |
| WO | WO2008/098380 | 8/2008 |
| WO | WO2009/056855 | 5/2009 |
| WO | WO2010/020795 | 2/2010 |
| WO | WO2010/116119 | 10/2010 |
| WO | WO2011/058313 | 5/2011 |
| WO | WO2011/058314 | 5/2011 |

OTHER PUBLICATIONS

Unpublished U.S. Appl. No. 13/320,882 filed on Nov. 16, 2011 entitled: Fracture Monitoring.
Preliminary Amendment filed on Nov. 16, 2011 in U.S. Appl. No. 13/320,882.
Unpublished U.S. Appl. No. 13/320,884 filed on Nov. 16, 2011 entitled: Well Monitoring by Means of Distributed Sensing Means.
Preliminary Amendment filed on Nov. 16, 2011 in U.S. Appl. No. 13/320,884.

* cited by examiner

WELL MONITORING BY MEANS OF DISTRIBUTED SENSING MEANS

This is a divisional of co-pending U.S. patent application Ser. No. 13/320,877, filed on Nov. 16, 2011 which is a 371 application of PCT/GB2010/001064, filed on May 27, 2010 which claims priority to GB 0919915.9 filed on Nov. 13, 2009 and to GB 0909038.2 filed on May 27, 2009 the specifications of each which are incorporated herein by reference.

FIELD OF THE INVENTION

The present invention relates to monitoring of production wells such as oil and gas wells. Such monitoring is often referred to as downhole monitoring. In particular, the present invention relates to downhole monitoring using distributed acoustic sensing (DAS).

BACKGROUND OF THE INVENTION

Fibre optic sensors are becoming a well-established technology for a range of applications, for example geophysical applications. Fibre optic sensors can take a variety of forms, and a commonly adopted form is to arrange a coil of fibre around a mandrel. Point sensors such as geophones or hydrophones can be made in this way, to detect acoustic and seismic data at a point, and large arrays of such point sensors can be multiplexed together using fibre optic connecting cables, to form an all fibre optic system. Passive multiplexing can be achieved entirely optically, and an advantage is that no electrical connections are required, which has great benefit in harsh environments where electrical equipment is easily damaged.

Fibre optic sensors have found application in downhole monitoring, and it is known to provide an array of geophones in or around a well to detect seismic signals with the aim of better understanding the local geological conditions and extraction process. A problem with such an approach is that geophones tend to be relatively large and so installation downhole is difficult. In addition geophones tend to have limited dynamic range.

WO 2005/033465 describes a system of downhole acoustic monitoring using a fibre having a number of periodic refractive index perturbations, for example Bragg gratings. Acoustic data is retrieved by portions of the fibre and used to monitor downhole conditions.

SUMMARY OF THE INVENTION

It is an object of the present invention to provide improved downhole monitoring systems and methods.

According to a first aspect of the invention there is provided a method for downhole monitoring comprising interrogating an unmodified optic fibre arranged along the path of a well bore to provide distributed acoustic sensing; simultaneously sampling data gathered from a plurality of contiguous portions of said fibre; and processing said data to determine one or more well bore parameters.

Distributed acoustic sensing (DAS) offers an alternative form of fibre optic sensing to point sensors, whereby a single length of longitudinal fibre is optically interrogated, usually by one or more input pulses, to provide substantially continuous sensing of acoustic/vibrational activity along its length. Optical pulses are launched into the fibre and the radiation backscattered from within the fibre is detected and analysed. Rayleigh backscattering is most usually detected. By analysing the radiation backscattered within the fibre, the fibre can effectively be divided into a plurality of discrete sensing portions which may be (but do not have to be) contiguous. Within each discrete sensing portion mechanical vibrations of the fibre, for instance from acoustic sources, cause a variation in the amount of radiation which is backscattered from that portion. This variation can be detected and analysed and used to give a measure of the intensity of disturbance of the fibre at that sensing portion. As used in this specification the term "distributed acoustic sensor" will be taken to mean a sensor comprising an optic fibre which is interrogated optically to provide a plurality of discrete acoustic sensing portions distributed longitudinally along the fibre and acoustic shall be taken to mean any type of mechanical vibration or pressure wave, including seismic waves. The method may therefore comprise launching a series of optical pulses into said fibre and detecting radiation Rayleigh backscattered by the fibre; and processing the detected Rayleigh backscattered radiation to provide a plurality of discrete longitudinal sensing portions of the fibre. Note that as used herein the term optical is not restricted to the visible spectrum and optical radiation includes infrared radiation and ultraviolet radiation.

The single length of fibre is typically single mode fibre, and is preferably free of any mirrors, reflectors, gratings, or (absent any external stimulus) change of optical properties along its length. This provides the advantage that an unmodified, substantially continuous length of standard fibre can be used, requiring little or no modification or preparation for use. A suitable DAS system is described in GB2442745 for example, the content of which is hereby incorporated by reference. Such a sensor may be seen as a fully distributed or intrinsic sensor as it uses the intrinsic scattering processed inherent in an optical fibre and thus distributes the sensing function throughout the whole of the optical fibre.

Since the fibre has no discontinuities, the length and arrangement of fibre sections corresponding to each channel is determined by the interrogation of the fibre. These can be selected according to the physical arrangement of the fibre and the well it is monitoring, and also according to the type of monitoring required. In this way, the distance along the fibre, or depth in the case of a substantially vertical well, and the length of each fibre section, or channel resolution, can easily be varied with adjustments to the interrogator changing the input pulse width and input pulse duty cycle, without any changes to the fibre. Distributed acoustic sensing can operate with a longitudinal fibre of 40 km or more in length, for example resolving sensed data into 10 m lengths. In a typical downhole application a fibre length of a few kilometers is usual, i.e. a fibre runs along the length of the entire borehole and the channel resolution of the longitudinal sensing portions of fibre may be of the order or 1 m or a few meters. As mentioned below the spatial resolution, i.e. the length of the individual sensing portions of fibre, and the distribution of the channels may be varied during use, for example in response to the detected signals.

The optic fibre is preferably located within the well bore to be monitored. In one arrangement the optic fibre runs along the exterior of the well casing, although the fibre could, in some embodiments, be arranged to run within the casing. The optic fibre may be attached to the well casing as it is inserted into the well bore and, if on the exterior of the casing, subsequently cemented in place in those sections of the well which are cemented.

The fibre may therefore follow the general route of the well bore and extends at least as far into the well bore as the region it is wished to monitor, preferably for substantially the whole length of the well bore. The fibre can therefore be interrogated to provide one, or preferably a plurality, of acoustic sensing portions arranged along the whole or part or parts of the well bore. The positions or locations of the sensing portions of interest should generally be known from a knowledge of the length along the fibre, and hence the well. However, when certain well processes are performed, such as perforation during formation of the well, the method may comprise monitoring the acoustic disturbances in the fibre generated by the process, e.g. perforation, to determine portions of the fibre that sections of interest of the well. For instance, portions of the fibre which exhibit the greatest acoustic disturbance intensity during perforation will generally correspond to the location where the perforation charges fired.

The method of the present invention may be used to determine at least one well bore parameter. The at least one well bore parameter may comprise a well condition profile. The well condition profile may be an acoustic profile of one or more sections of well or the whole of the length of the well. The acoustic profile may be obtained by measuring the acoustic signals determined by the DAS sensor in response to an acoustic stimulus. The acoustic stimulus could be stimulus which is applied specifically for the purposes of determining an acoustic profile. In some instances it may additionally or alternatively be possible to use an acoustic stimulus that is generated in the normal course of the well fabrication or operation. In particular the perforation step of well production involves firing one or more perforation charges. This provides an intense acoustic stimulus that can be used to acquire an acoustic profile of the well at that stage of completion.

Well bore parameters may be provided in real-time. Real-time, as the term is used in the present specification, means that there is no significant delay between an acoustic signal being detected by the fibre and the well bore parameter being generated. The method may involve providing a generally accurate representation of the acoustic signals being currently detected by the distributed acoustic sensor.

As well as determining various well bore parameters, in use, the acoustic signals from one or more relevant section of fibre may be played on a suitable audio device. This will provide the personnel operating the well, or a particular downhole process, with audible feedback of what is actually happening down the well. An operator listening to the signals produced by an acoustic channel of the fibre may therefore be provided with real-time audio feedback of the acoustic disturbance downhole.

It will be appreciated that the conditions down a deep well bore can be hostile. Therefore placement of a specific sensor down the well bore, especially at the time that well fabrication processes are being performed, has not hitherto been practical. The method of the present invention uses a fibre optic which may to be located on the exterior of the well casing to provide a downhole sensor in the well bore during formation of the well and also during subsequent oil/gas production.

The method may comprise analysing the intensity levels of acoustic disturbances detected downhole.

The acoustic information from various sensing portions of the fibre may be displayed on a suitable display. There are various methods in which the intensity of the selected channels may be displayed. For instance the display may show, for each channel, the current intensity, maximum intensity and/or an average intensity of the acoustic signals over a predefined or selected time period in a histogram type arrangement. Additionally or alternatively the real-time indication may comprise a waterfall plot representing intensity by colour or greyscale and plotting the intensity for each channel against time.

The method may also provide performing frequency analysis on the data and the real-time indication may comprise an indication of the frequency of acoustic signals detected by at least one longitudinal portion of fibre in the vicinity of the downhole process. The indication of frequency may comprise a histogram type plot of current, maximum or average frequency against channel and/or a waterfall type plot with frequency represented by colour or greyscale such as described above. Where the method involves dividing the data from the longitudinal sensing portions of the fibre into one or more spectral bands, the indication may additionally or alternatively comprise an indication of the intensity within a particular frequency band. In other words the data may be filtered so as to include only acoustic disturbances with a frequency within the frequency range of the particular band. Analysing the data by spectral band can more clearly indicate the acoustic difference between various channels in some situations.

By presenting the intensity and/or frequency of the selected channels an operator may be able to determine if there is any significant activity in any particular channel.

Providing an audible indication of the data from the DAS sensor and/or providing an indication of the intensity and/or frequency of the data provides useful feedback data that can be generated quickly without an excessive processing overhead.

The method may also comprise detecting transients, especially relatively high frequency transients, in the acoustic signal.

The method may also comprise using data from at least one other sensor at another location. The at least one additional sensor may comprise another fibre optic distributed acoustic sensor, for instance a DAS sensor which is placed in an existing well in the surrounding area and/or a DAS sensor in an observation bore hole drilled nearby and/or a DAS sensor arranged at or near the surface of the general area, such as buried in a trench. The combination of data from many different sensors in different locations may allow the point of origin, or at least general area of origin, of acoustic disturbances to be determined.

In a further aspect of the invention there is provided a system for downhole monitoring, a fibre optic interrogator adapted to provide distributed acoustic sensing on an unmodified fibre arranged along the path of a well bore; a sampler arranged to sample a plurality of channels output from said interrogator simultaneously to provide acoustic data from a plurality of contiguous portions of said fibre at each of a plurality of times; and a data analyser adapted to process said sampled data to detect well events and output parameters associated with detected events.

The invention also provides a processor, computer program and/or a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
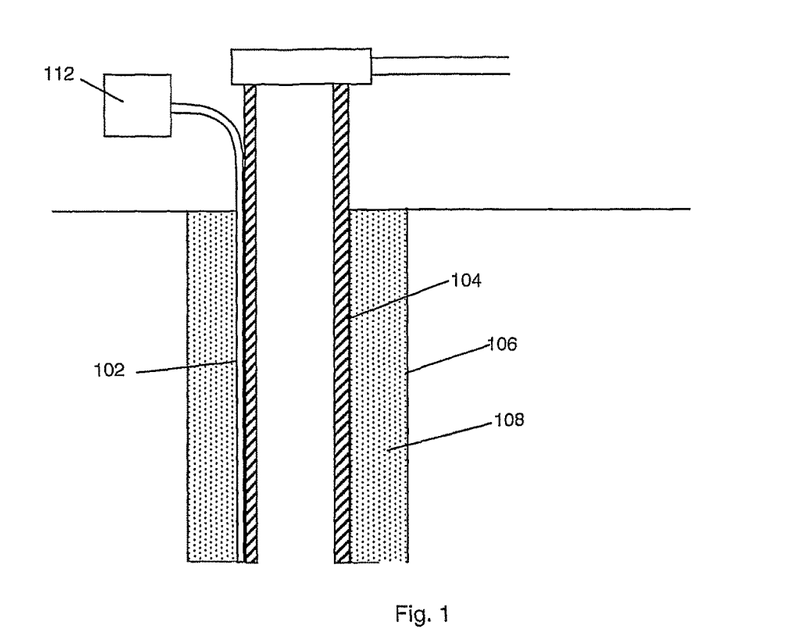
FIG. 1 shows apparatus for monitoring a well using DAS.

A fibre optic cable 102 is included along the path of a well, which in the present example is a gas well, and may be on or offshore. The well is formed at least in part by a metallic production casing 104 inserted into a bore hole 106, with the space between the outer wall of the casing and the hole being back filled with cement 108 in the present example. The production casing may be formed of multiple sections joined together, and in certain instances the sections will have different diameters. In this way the casing diameter is able to narrow gradually towards the bottom of the well. As can be seen in FIG. 1, in this example the fibre passes through the cement back fill, and is in fact clamped to the exterior of the metallic casing. It has been found that an optical fibre which is constrained, in this instance by passing through the cement back fill, exhibits a different acoustic response to certain events to a fibre which is unconstrained. An optical fibre which is constrained may give a better response than one which is unconstrained and thus in some embodiments it is beneficial to ensure that the fibre in constrained by the cement. The difference in response between and constrained and unconstrained fibre may also be used as an indicator of damage to the cement which can be advantageous will be described later.

The fibre protrudes from the well head and is connected to interrogator/processor unit 112. The interrogator unit injects light into the fibre and senses radiation backscattered from along the length of the fibre. The particular form of the input light and sampling/processing capability of the unit allows simultaneous output of multiple data channels, each channel corresponding to acoustic data sensed along a particular section of the fibre at a particular distance along the fibre. While the interrogator/processor unit is shown here as a single item, hardware may be divided among, for example, an interrogator box providing a raw data output, feeding a PC or portable computer to provide the data processing capability.

Figure 2:
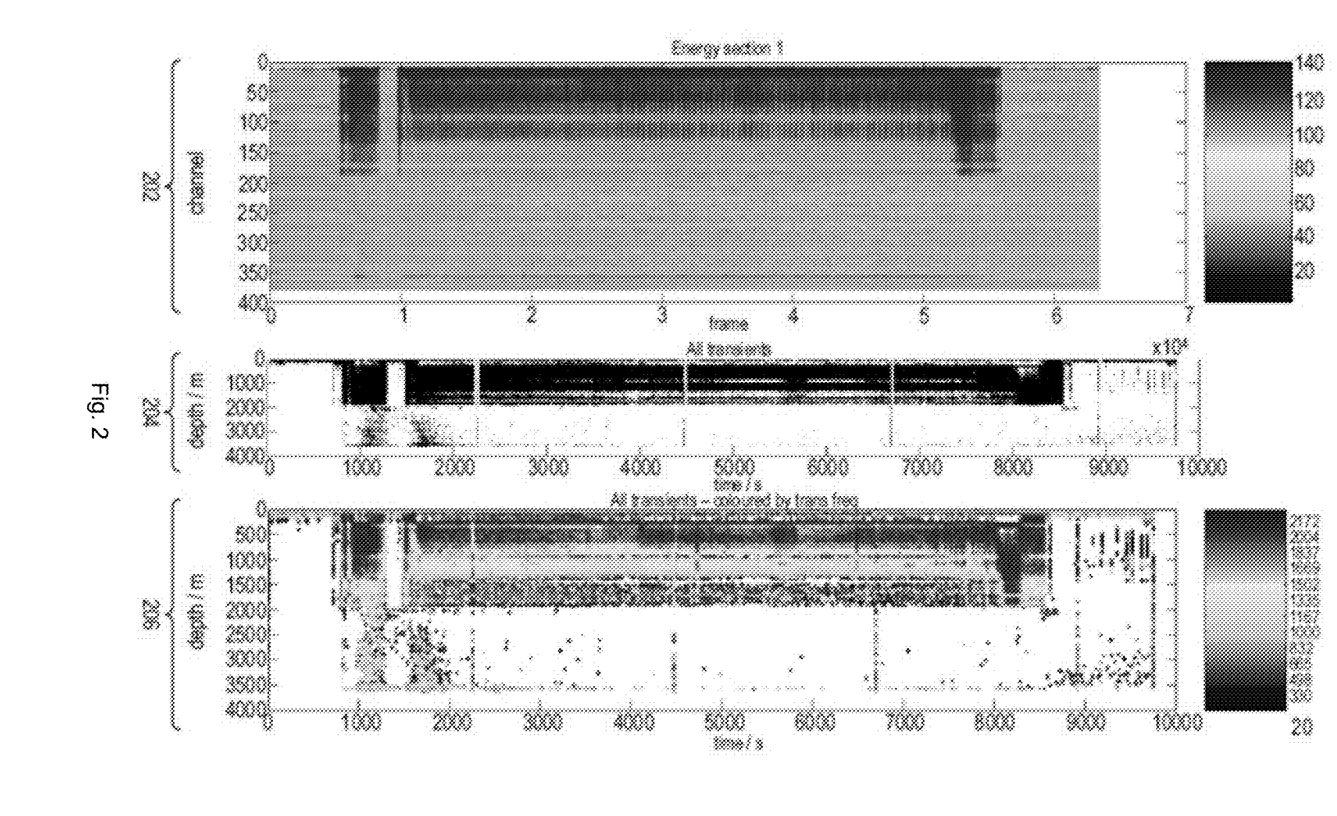
FIG. 2 illustrates the output of the system of FIG. 1.

An example of the type of possible data output from the arrangement of FIG. 1 is shown in FIG. 2. Here in the upper plot 202, channel number (and hence depth for substantially vertical wells) is displayed along the y axis, with zero representing the channel nearest the surface. 400 channels are shown. Time is displayed along the x axis as frame number, to provide a 'waterfall' plot which is continuously refreshed as new data is made available. Detected energy intensity is shown as colour or greyscale in the upper plot 202, using a scale shown on the right hand side to provide a 2D visualisation of the acoustic energy distribution along the entire sensed length of the fibre at each of a series of time instants. The central plot 204 shows the same data after undergoing transient detection as will be explained in greater detail below, and the lower plot 206 shows the frequency of the detected transients according to the scale to the right of the plot. The arrangement is such that data is available from all channels at every sample period. In the middle 204 and lower plots 206, depth from 0 to 4000 m is represented on the y axis, with time from 0 to 10000 s on the x axis It is proposed to use the system described above to monitor various downhole events including perforation, blanking plug and/or packer setting, fracture, proppant wash out and fluid flow. In addition the system may provide general condition monitoring and, in some arrangements, may also allow communication with downhole sensors.

In a typical extraction process, once the well has been drilled and a casing installed (and one or more fibres provided along the path of the well) the well is perforated to allow ingress of gas, or fluid, such as oil or water, being extracted. This is commonly achieved using shaped charges which are lowered into the well in a 'gun' and fired at a desired depth and orientation. The charge pierces the casing and ruptures the adjacent rock (and any filling material such as cement if present).

Subsequently, a fluid, such as water, is pumped down the well under high pressure. This fluid is therefore forced into the perforations and, when sufficient pressure is reached, causes fracturing of the rock along weak stress lines and to create and enlarge permeable paths for gas or other fluid to enter the well. A solid particulate, such as sand, is typically added to the fluid to lodge in the fractures that are formed and keep them open.

Once a set of fractures at one level has been created it may be wished to create another set of fractures at another level. A blanking plug is therefore inserted down the well to block the section of well just perforated. The perforating and fracturing process is then repeated at a different level.

This process is repeated until all necessary fractures have been completed. At this point the blanking plugs may be drilled out and production tubing may be inserted down the well bore. Packers may be inserted between the production tubing and the casing to close the gap. Screens and/or gravel packs may be inserted at the perforation sites where inflow is expected to filter the oil/gas.

Once complete, the well starts production with product entering the casing from adjacent rock formations, and being transported to the surface.

Perforation Monitoring

In one embodiment of the present invention a DAS sensor is used to monitor the perforation event. Monitoring the perforation event can serve at least two distinct purposes. Firstly the location of the perforation can be determined. It can be difficult to control exactly the direction of the perforation in a borehole and so detecting the location of the perforation can aid in control and planning of further perforations. The ability to detect perforation type events will be described later. Also the acoustic signature of the perforation event may be compared to certain expected characteristics to determine whether the perforation occurred satisfactorily.

In addition to monitoring the perforation itself the perforation event is a relatively high energy event which acoustically excites a large proportion of the well bore, i.e. the casing, the cement, any blanking plugs already in place etc.

The acoustic response to a perforation event allows an acoustic profile of the well bore to be collected and assessed.

Acoustic data is sampled at between 0.2 Hz and 20 kHz over the length of the drilled hole during a perforation event. The energy present in each channel is monitored by either a bandpass filter and then an rms energy calculation, or by performing an FFT and summing power between an upper and lower frequency band (typically 512 pt FFT, 50% overlapped, filtered between 300 and 5 kHz if sampling rate is practical). A 2D data array of detected energy for time and depth (or position) can be produced.

Figure 3:
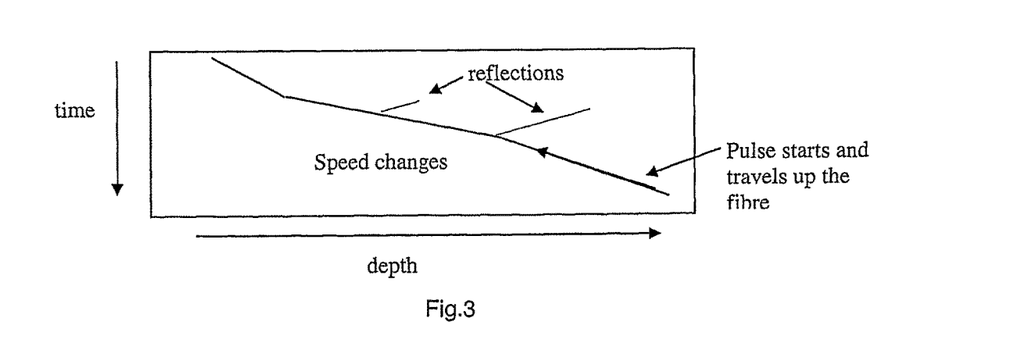
FIG. 3 is a schematic representation of a perforation event as monitored by an embodiment of the present invention.

Further processing of the data array by identifying peaks reveals that the impulsive perforation signal propagates up and down the well casing as well as into the rock. An energy plot as described above can therefore be produced, and a trace can be identified tracking the progress of the pulse as shown in FIG. 3.

The gradient of the identifiable trace can be measured, as it is the rate at which the energy is propagating through the well casing. This gives a measure of the transmission speed in the medium. This can be used to indicate areas of the well casing that are different because their transmission speed changes. This could indicate a problem with the casing attachment, or structural issues in the casing itself.

An automated tracking algorithm could be used to calculate the speed of this energy trace and determine areas where the speed changes.

In one embodiment an algorithm may work on the assumption that the event of interest is much larger than the normal state of the well, so that the peak in energy identified as the perforation event can be reliably identified. Then the peak can be associated over successive time frames, with the average speed over 1, 2, 3, . . . 10 s can be calculated. Further improvements could track multiple peaks at the same time (useful for distinguishing the main pulse in the case of multiple reflections).

Further inspection of FIG. 3 shows clear points of reflection of energy. These arise at joins in the casing and can provide an engineer with information concerning the quality of the joins across the length of the casing. Anywhere there is a significant mismatch in material, a partial reflection may occur, and the larger the mismatch, the greater is the reflection coefficient. Other material failures such as cracks or pitting could significantly affect the propagation of the energy along the casing and fibre, and be identified using this method.

For instance the condition of the cement surrounding the casing may be assessed. The acoustic response of the cement may vary in areas where there is a significant void in the cement, either due to manufacturing as the result of an earlier perforation or fracturing event. Voids in the cement can be problematic because if a subsequent perforation occurs in an area of void when the proppant is pumped into the well bore it may not flow into the perforations in the rock but into the void—wasting a large amount of proppant and halting well formation whilst the problem is addressed.

As mentioned above the response of an unconstrained fibre is different to that of a constrained fibre and thus if the fibre does itself pass through a void in the cement, and thus is unconstrained in that area, the acoustic response will be very different. Thus the present invention may include detecting voids in the cement surrounding the casing.

The positioning and condition of blanking plugs can also be assessed in this way. If the blanking plug is not located correctly or is incomplete or weakened it may fail during the subsequent fracturing step.

It will be understood that a well condition profile can be built up in this way, providing data on the casing, cement fill, and blanking plugs if present. The condition profile can be monitored over time to inform operators at various stages during well operation. The well condition profile need not be limited to only those times where a perforation event occurs, and an alternative acoustic stimulus can be provided at a desired point in time as appropriate.

Proppant Monitoring

Once the perforations have been made the proppant is flowed into the well to cause fracturing. As mentioned however in some instance the proppant may not flow into the rock and proppant wash out may occur. The flow of proppant in normal operation will generally proceed at a certain rate and with a certain characteristic. If the proppant finds another path or ceases to fracture correctly the flow conditions within the well may change. The acoustic response during proppant flow may therefore be monitored to detect any significant change.

Fracture Monitoring

Seismic and fracture events of interest are of a distinctly different nature from the continuous flow noise caused by the high pressure influx of water and sand during the fracturing process. Generally they are characterised by being short and impulsive events—hereafter referred to as transient events. A technique looking at short term variations away from the mean variable levels (the transient detector) will extract these events from background and long period noise. The general processing method is set out in FIG. 4.

Figure 4:
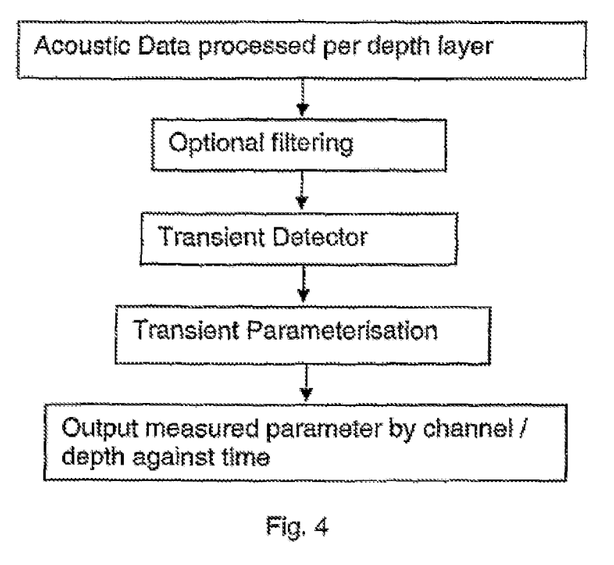
FIG. 4 illustrates seismic detection and parameterisation steps for fracture monitoring.

By processing the acoustic data received to highlight transient events in this way, a fracture event can be detected and observed, and the following parameters can be determined:

The depth at which fracture is occurring can be determined according to the channel at which fracture events are detected.

The rate at which fractures are occurring, or fracture density, can be determined according to the number and/or intensity of detected fractures over a defined time period or depth range.

A measure of fracture magnitude can be determined according to the measured duration of a fracture, and also the span of a fracture defined as the number of channels affected by a single event.

An estimate of range from the well can be made based on the frequency characteristics of a fracture event. To provide a single parameter for frequency, the mean frequency of the spectral shape of the event can be used. Other frequency parameters which can be determined include second order statistics such as skew and kurtosis.

In order to identify transients among other background data a measure of short term variability is compared with the normal or an average variability for a given channel.

In the present example this is achieved by populating statistics representing the mean energy and the mean absolute deviation about the mean (MAD: mean of absolute difference of current value and mean value).

These two statistics are updated by exponential averaging as each data update is received, using a decay term, N.

$$\text{Mean data} = ((N-1)/N)*\text{mean data} + (1/N)*\text{new Data}$$

$$\text{MAD} = ((N-1)/N)*\text{MAD data} + (1/N)*\text{abs}(\text{new Data} - \text{mean data})$$

Where the data first undergoes an FFT and where calculations are performed per channel and per frequency cell.

The transient level is then defined as:

Abs|View data−mean data|/MAD

This gives a value relating to how much a particular frequency cell is higher in variability than its average variability. Hence very variable channels are self regulating and it is only excessive and unusual variability that is detected. By varying the values of N the algorithm can be tuned to detect different length transient events. Typically factors of 4, 6, 8, . . . 128 are used but these depend on the length of the transient required and the FFT rate of the system. By performing this process in the frequency domain, a high degree of control is achieved over the frequencies used to form a transient event, and knowledge of the transient spectral structure is calculated and preserved for feature extraction.

The algorithm adaptively selects an exponential factor according to whether a transient is triggered. When recalculating the mean and medium values, if a frequency cell is above threshold as a detection it will use a different value for N (in this example 100N is used) meaning that the transient event is included in the general statistics at a much reduced rate compared with the normal events.

The location of fracture events may also be monitored to allow fracture mapping or fracture density mapping. In a typical production environment there may be several wells in the same oil or gas field. Ideally each well taps a different part of the field. However, it is possible for the fractures created in one well to run into the same area as the fractures from another well. In this instance the new well may not increase production as any production at the new well decrease production at the old well. It is therefore desirable to monitor the location of fractures. The use of a DAS system offers the ability to detect and monitor where the fracture event are occurring in real time, thus allow control over the fracturing process.

It has surprisingly been found that DAS systems may be used separately to detect P and S waves. P waves (pressure or primary waves) are longitudinal waves which propagate through solid material. S waves are shear waves or secondary waves which are transverse waves. Co-pending patent application PCT/GB2009/002055, the contents of which are hereby incorporated by reference thereto, describes how a DAS system can be used to detect P and S waves and discriminate between them. Detecting the S waves of the fracture event may allow the location to be determined. To determine the location of the fracture event multiple fibres and/or time of arrival type techniques may be used as described in co-pending application no. GB0919904.3 the contents of which is hereby incorporated by reference thereto. Further it will be noted that the S wave, being a transverse wave, will have a shear direction associated with the wave. Detection of the different components of the S wave will allow a determination of the orientation of the fracture. This is particularly useful as fractures in the horizontal plane are not preferred as the injected sand is generally insufficient to keep the fracture open given the weight of rock above. A vertical fracture is thus preferred. To detect the orientation of the S wave the incoming wave may be resolved into components in three dimensions. By arranging one or more sensing fibres in three dimensions the components of the incident wave may be resolved. The use of a fibre optic which preferentially responds in one direction may help resolve an incident acoustic wave into its components, as described in co-pending application GB0919902.7 (cable design), the contents of which are hereby incorporated by reference thereto.

Inflow Monitoring

The monitoring of fluid such as oil and gas flowing into a well from neighbouring rock formations typically requires much greater sensitivity than any of the previous techniques as it looks for the characteristic sound of oil or gas as it enters the casing pipe, a relatively quiet and subtle noise source. Detecting and quantifying the areas of inflow within a well is possible by analysing a 3D data set of detected activity by distance/depth over a time period, as can be shown using a 2D 'waterfall' energy map.

Figure 5:
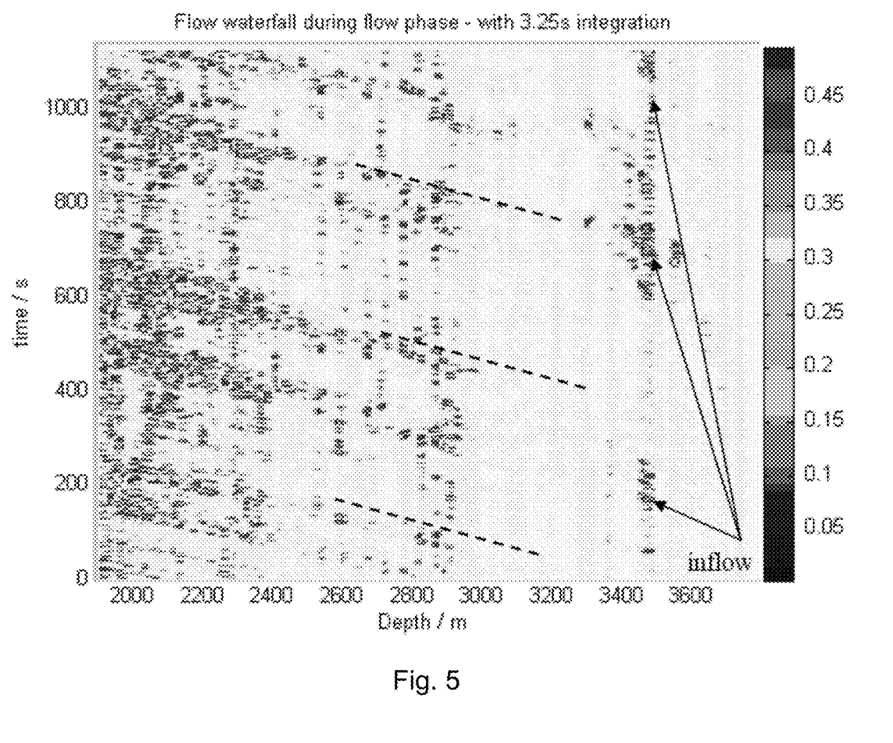
FIG. 5 shows the results of inflow monitoring having been enhanced using variance statistics.

The effects of interest are very subtle and typically manifest themselves as variations within the noise structure rather than easily discernible features above the noise as seen in perforation detection. Reliability and accuracy of detection can be improved by emphasising areas where the energy varies in a characteristic way. The variance statistics rather than the direct energy of each channel were examined over short periods of time and used to provide indications of inflow. As can be seen in FIG. 5 this technique shows more clearly the area of inflow (marked by an arrow) and the diagonal structures (emphasised with dashed line) caused by energy or material moving up the pipe.

Multiple methods of monitoring and parameterisation have been described above, and the different characteristics of the signals being and analysed (frequency content, amplitude, signal to noise) place a wide range of demands on the sensing apparatus. Due to the large dynamic range and the relatively high sampling rates of the DAS monitoring system however, all of the above monitoring and processing can be performed using the same system as shown schematically in FIG. 1.

In addition, and as mentioned above, the configuration of the channels can also be adjusted, and different channel settings can be used for different monitoring operations. The channel settings can also be adaptively controlled in response to monitored data, for example if a significant fracture density occurs at a certain depth, it may be desirable to monitor that particular depth with greater resolution for a period of time, before reverting to the original channel configuration.

In this way a complete monitoring program can be run by a single system over a whole sequence of well operations from perforation to fluid inflow. The system can be arranged to transition from one type of detection to another in response to detected events, and can adaptively vary both sensing and data processing parameters for a given monitoring/detection activity.

In addition the DAS system may be used as a means of communicating with downhole sensors. US2009/0003133 describes a method of transmitting data from down well sensors and the like using acoustic using the casing itself as an acoustic medium. Instead the acoustic fibre may be used to receive encoded acoustic signals which means that lower power signals could be transmitted and done so reliably.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method for downhole monitoring comprising:
    interrogating an unmodified optic fibre arranged along the path of a well bore to provide distributed acoustic sensing;
    simultaneously sampling data gathered from a plurality of contiguous portions of said fibre; and processing said data to determine one or more well bore parameters;

wherein processing said data includes detecting the response to an acoustic stimulus, and wherein said parameter is a well condition profile.

2. A method according to claim 1, wherein said acoustic stimulus comprises a perforation event, and the step of determining said well condition profile comprises determining the speed of an acoustic pulse in the well bore casing.

3. A method according to claim 1, wherein processing said data includes detecting at least one fracture event, and said parameters include at least one of: depth of fracture, rate of fracturing, range of fracture, and fracture density.

4. A method according to claim 1, wherein processing said data includes detecting well fluid flow, and said parameters include flow rate and depth of flow.

5. A method according to claim 1, wherein processing comprises detecting multiple event types.

6. A method according to claim 1, wherein the sampling rate is greater than or equal to 1 kHz.

7. A method according to claim 1, wherein the sampling rate is greater than or equal to 5 kHz.

8. A method according to claim 1, wherein at least 100 channels are sampled simultaneously.

9. A method according to claim 1, wherein at least 250 channels are sampled simultaneously.

10. A method according to claim 1, wherein said channels correspond to contiguous portions of fibre less than or equal to 10 m in length.

11. A method according to claim 1, wherein processing said data comprises performing transient detection.

12. A method according to claim 11, wherein transient detection includes maintaining a measure of mean absolute deviation.

13. A method according to claim 12, wherein said measure of mean absolute deviation is updated by exponential averaging using a decay term, N.

14. A method according to claim 13, wherein said decay term N is adaptively varied.

15. A method according to claim 1, wherein processing said data comprises frequency analysis.

16. A method according to claim 1, wherein said data is processed in real time.

17. A method according to claim 1, further comprising adjusting interrogation parameters to vary the contiguous portions of fibre from which data is sampled.

18. A method according to claim 17, wherein said interrogation parameters are adjusted adaptively in response to detected events.

19. A system for downhole monitoring, said system comprising:

a fibre optic interrogator adapted to provide distributed acoustic sensing on an unmodified fibre arranged along the path of a well bore;

a sampler arranged to sample a plurality of channels output from said interrogator simultaneously to provide acoustic data from a plurality of contiguous portions of said fibre at each of a plurality of times; and a data analyser adapted to process said sampled data to detect well events and output parameters associated with detected events;

wherein said data analyser is configured to detect the response to an acoustic stimulus, and determine a well condition profile.

20. A system according to claim 19 adapted to detect multiple event types.

21. A system according to claim 19, adapted to detect both fracture events and fluid inflow.

* * * * *